(12) United States Patent
Fuqua et al.

(10) Patent No.: US 10,190,492 B2
(45) Date of Patent: Jan. 29, 2019

(54) DUAL CRANKSHAFT, OPPOSED-PISTON ENGINES WITH VARIABLE CRANK PHASING

(71) Applicant: Achates Power, Inc., San Diego, CA (US)

(72) Inventors: Kevin B. Fuqua, San Diego, CA (US); Fabien G. Redon, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 448 days.

(21) Appl. No.: 13/858,943

(22) Filed: Apr. 8, 2013

(65) Prior Publication Data

US 2014/0299109 A1    Oct. 9, 2014

(51) Int. Cl.
| | |
|---|---|
| F02B 75/28 | (2006.01) |
| F01L 1/344 | (2006.01) |
| F01B 7/14 | (2006.01) |
| F16H 57/00 | (2012.01) |

(52) U.S. Cl.
CPC .............. F02B 75/28 (2013.01); F01B 7/14 (2013.01); F01L 1/3442 (2013.01); *F16H 57/0025* (2013.01)

(58) Field of Classification Search
CPC ............ F01B 7/14; F02B 75/28; F01L 1/3442
See application file for complete search history.

(56) References Cited

U.S. PATENT DOCUMENTS

| | | | |
|---|---|---|---|
| 2,357,031 A | 8/1944 | Stabler | |
| 2,398,640 A | 4/1946 | Hickey | |
| 4,856,463 A | 8/1989 | Johnston | |
| 7,568,453 B2 | 8/2009 | Augstrom | |
| 2007/0028866 A1 | 2/2007 | Lindsay | |
| 2012/0085302 A1* | 4/2012 | Cleeves | 123/55.2 |
| 2012/0103300 A1 | 5/2012 | Fernandez | |
| 2012/0152195 A1 | 6/2012 | Schulze et al. | |
| 2012/0285422 A1 | 11/2012 | Exner et al. | |

FOREIGN PATENT DOCUMENTS

WO    WO 98/02674    1/1998

OTHER PUBLICATIONS

International Search Report and Written Opinion for PCT/US2014/033066, dated Sep. 10, 2014.

* cited by examiner

*Primary Examiner* — Jacob Amick
(74) *Attorney, Agent, or Firm* — Terrance A. Meador (57) ABSTRACT

The timing or phasing of port openings and closings during operation of an opposed-piston engine is varied in response to changing engine speeds and loads by changing crankshaft phasing.

12 Claims, 9 Drawing Sheets

DUAL CRANKSHAFT, OPPOSED-PISTON ENGINES WITH VARIABLE CRANK PHASING

RELATED APPLICATIONS

This Application contains subject matter related to the subject matter of commonly-assigned U.S. application Ser. No. 13/385,539, filed Feb. 23, 2012 for "Dual Crankshaft, Opposed-Piston Engine Constructions", published as US 2012/0285422 A1 on Nov. 15, 2012.

BACKGROUND

The subject matter relates to a dual-crankshaft, opposed-piston engine equipped for variable crankshaft phasing in order to change port timing and/or port phasing in response to changing engine conditions. Particularly, the subject matter relates to an opposed-piston engine with two crankshafts coupled by a gear train in which a phasing mechanism coupled to at least one crankshaft varies port timing in the engine by changing the rotational phasing between the crankshafts, an operation referred to as "crank phasing".

In an opposed-piston engine, a pair of pistons is disposed for opposed sliding motion in the bore of at least one ported cylinder. Each cylinder has exhaust and intake ports, and the cylinders are juxtaposed and oriented with exhaust and intake ports mutually aligned. Each port is constituted of one or more arrays or sequences of openings disposed circumferentially in the cylinder wall near a respective end of the cylinder. The engine includes two crankshafts rotatably mounted near respective exhaust ends and intake ends of the cylinders, and each piston is coupled to a respective one of the two crankshafts. The reciprocal movements of the pistons control the operations of the ports. In this regard, each port is located at a fixed position where it is opened and closed by a respective piston at predetermined times during each cycle of engine operation. Those pistons that control exhaust port operation are termed "exhaust pistons" and those that control intake port operation are called "intake pistons".

Typically in opposed-piston engines the exhaust piston is phased in relation to the intake piston so as to enhance exhaust gas purging and scavenging during the later portion of the power stroke.

Piston phasing is normally fixed by positioning the exhaust piston connecting rod at some advanced angle on the crankshaft to which it is connected ("the exhaust crankshaft") ahead of the intake piston connecting rod position on the crankshaft to which it is connected ("the intake crankshaft"). In such a configuration, as the pistons move away from top center (TC) positions after combustion, both ports (intake and exhaust) are closed by their respective pistons. As the pistons approach bottom center (BC) positions the exhaust port is opened first to begin exhaust gas purging and then the intake port opens some preset time later to allow pressurized air into the cylinder chamber to provide scavenging of the remaining exhaust gasses. Then, as the pistons reverse direction, the exhaust port closes first, allowing pressurized air into the cylinder chamber through the still open intake port until it too closes and a compression cycle begins.

It is desirable to be able to vary the timing or phasing of port openings and closings during engine operation in order to dynamically adapt the time that a port remains open to changing speeds and loads that occur during engine operation.

It is desirable to be able to vary the timing or phasing of port openings and closings during engine operation in order to maintain optimal blowdown, uniflow scavenging, and/or supercharger operations in the face of changing engine operating conditions.

Some opposed-piston engine designs do not utilize the pistons for port control. Instead, these engines are equipped with reciprocating sleeves that slide axially along the cylinder sidewall to open and close ports. Such arrangements are termed "sleeve valves" and port timing depends upon control of sleeve valve position and movement. Port phasing in sleeve valve engines presents very complicated control challenges that have to provide for timing the movements of crankshafts, pistons, and valve sleeves. Moreover, an important advantage of opposed-piston engines is the relative simplicity of engine construction: an opposed-piston engine dispenses with cylinder heads and many moving parts associated with valves and valve train mechanisms of single-piston engines. Much of this simplification is surrendered by the sleeve valve constructions.

It is therefore desirable to be able to control port phasing in an opposed-piston engine by relying on piston phasing to dynamically adapt port opening and closing times to changing speeds and loads that occur during engine operation. The objective is to secure the benefits realized by adapting port operation to varying engine operating conditions without sacrificing the simplifications achieved with opposed-piston constructions.

SUMMARY

Port phasing in an opposed-piston engine with two crankshafts is varied to accommodate specific engine loads or operating parameters during engine operation. Preferably, port phasing is controlled by varying the crank angle of at least one crankshaft, where the crank angle is an angle of rotation of the crankshaft with respect to the angle which places a piston connected to the crankshaft at a specific point in its slidable movement. For example, the specific point could be the top center (TC) position of the piston.

In some aspects, port phasing is enabled by equipping the engine with a phasing mechanism coupled to at least one crankshaft so as to vary the crank angle of the crankshaft, which changes rotational phasing between the crankshafts and a shift in the positions of pistons coupled to the crankshaft relative to the pistons not coupled to the crankshaft.

In some aspects, an opposed-piston engine with two crankshafts has at least one of the crankshafts equipped with an electronically-controlled, hydraulically actuated movable vane structure for adjusting the rotational position of the crankshaft based upon engine operating parameters so as to thereby vary piston phasing.

In some aspects, an electronically-controlled, hydraulically-actuated crankshaft phasing mechanism includes a pair of coaxially-disposed vane elements, one fixed to one of the crankshafts and the other mounted to the crankshaft's output gear. Hydraulic fluid is used to control the relative positions of the vane elements and thus to control the phasing between the crankshafts. Hydraulic pressure between the elements' vanes is electronically controlled to obtain a desired rotational relationship between the two crankshafts, thereby establishing a phase relationship between the opposing pistons.

BRIEF DESCRIPTION OF THE DRAWINGS

The below-described drawings are meant to illustrate principles and examples discussed in the following description; they are not necessarily to scale.

DETAILED DESCRIPTION OF PREFERRED EMBODIMENTS

Figure 1A:
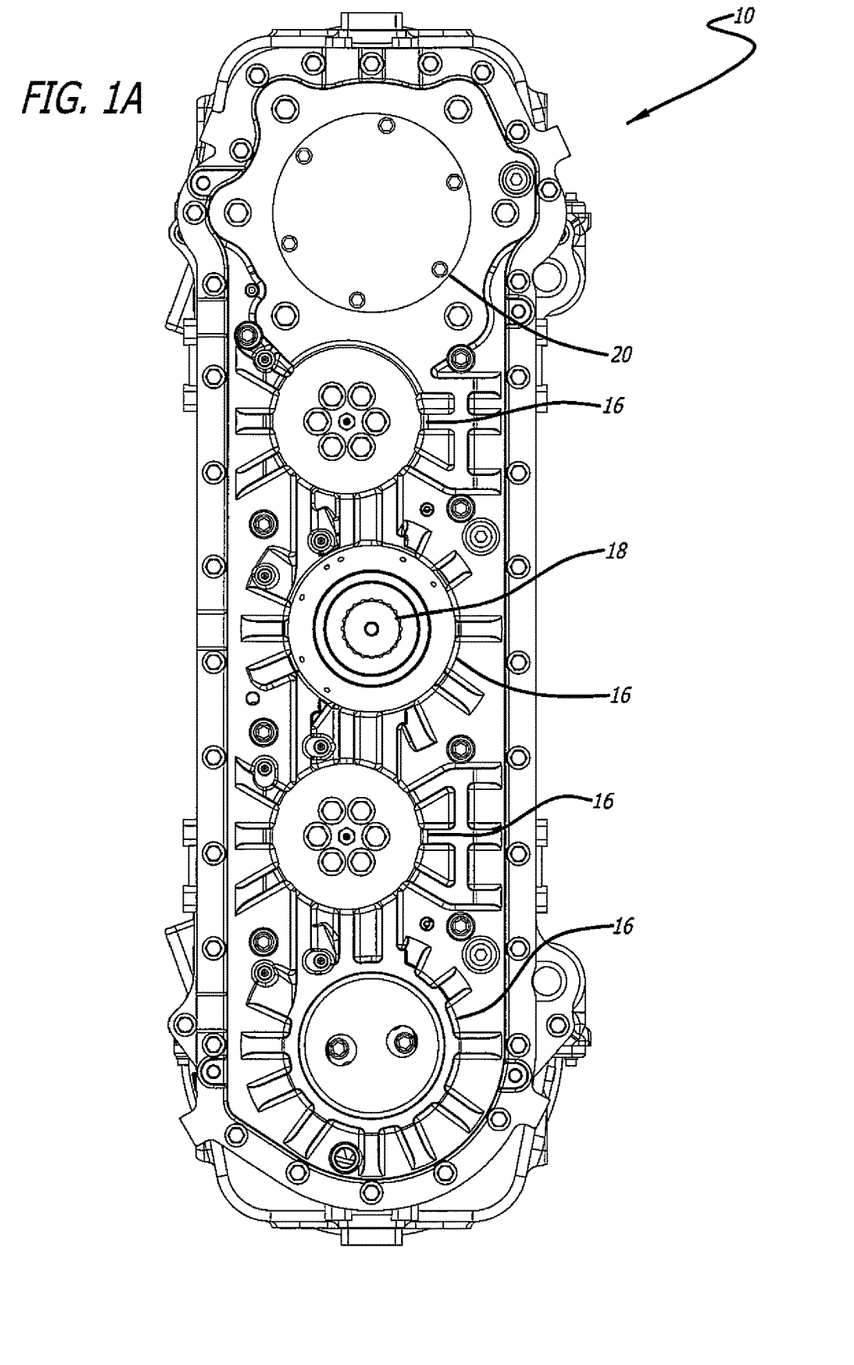
FIG. 1A is an end view of an opposed-piston engine equipped with an electronically controlled, hydraulically-actuated crank phasing mechanism.
Figure 1B:
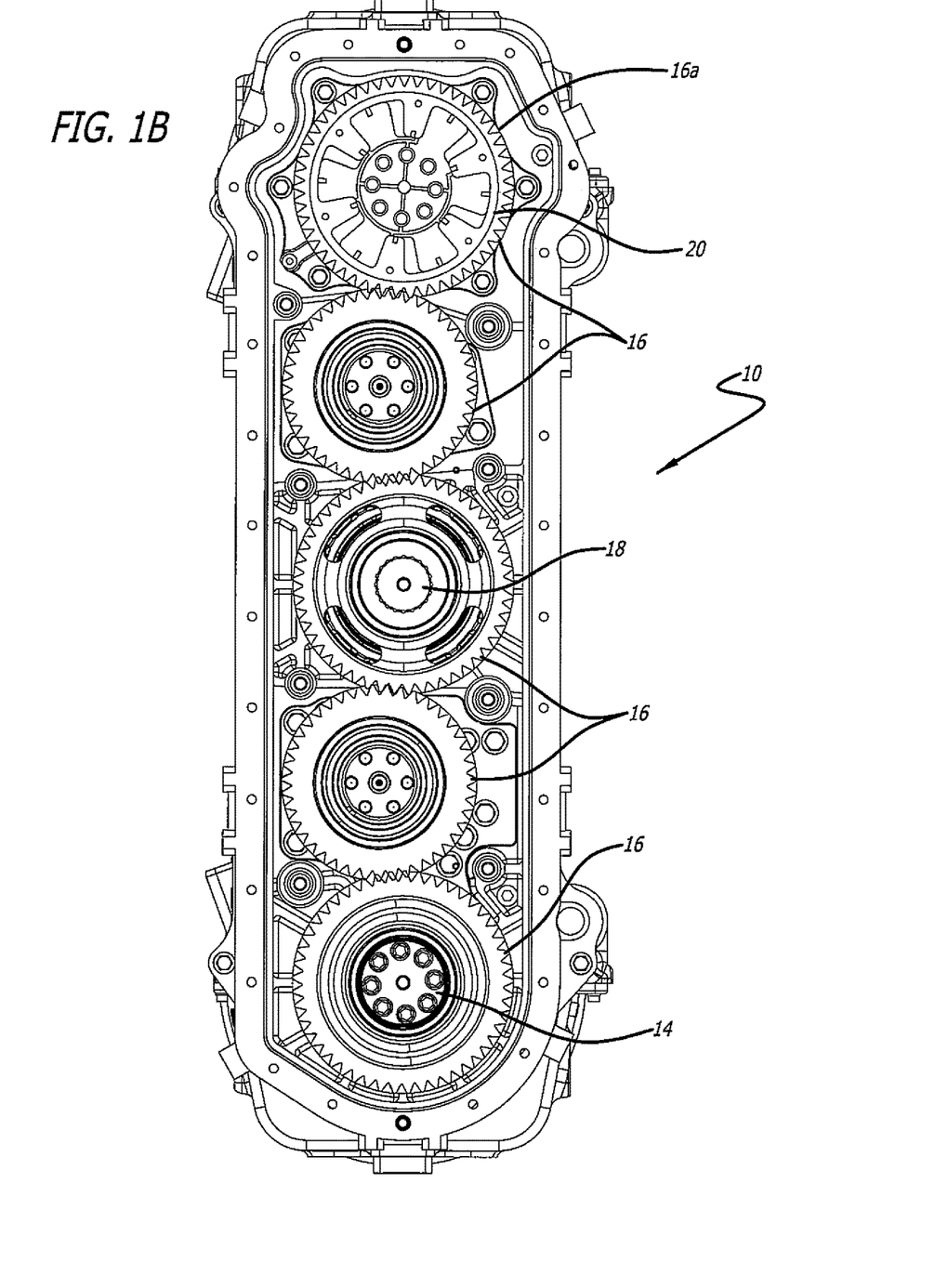
FIG. 1B is the end view of the engine of FIG. 1A, with a cover removed to show a gear train coupling two crankshafts and an end plate removed to show details of a crank phasing mechanism.
Figure 1C:
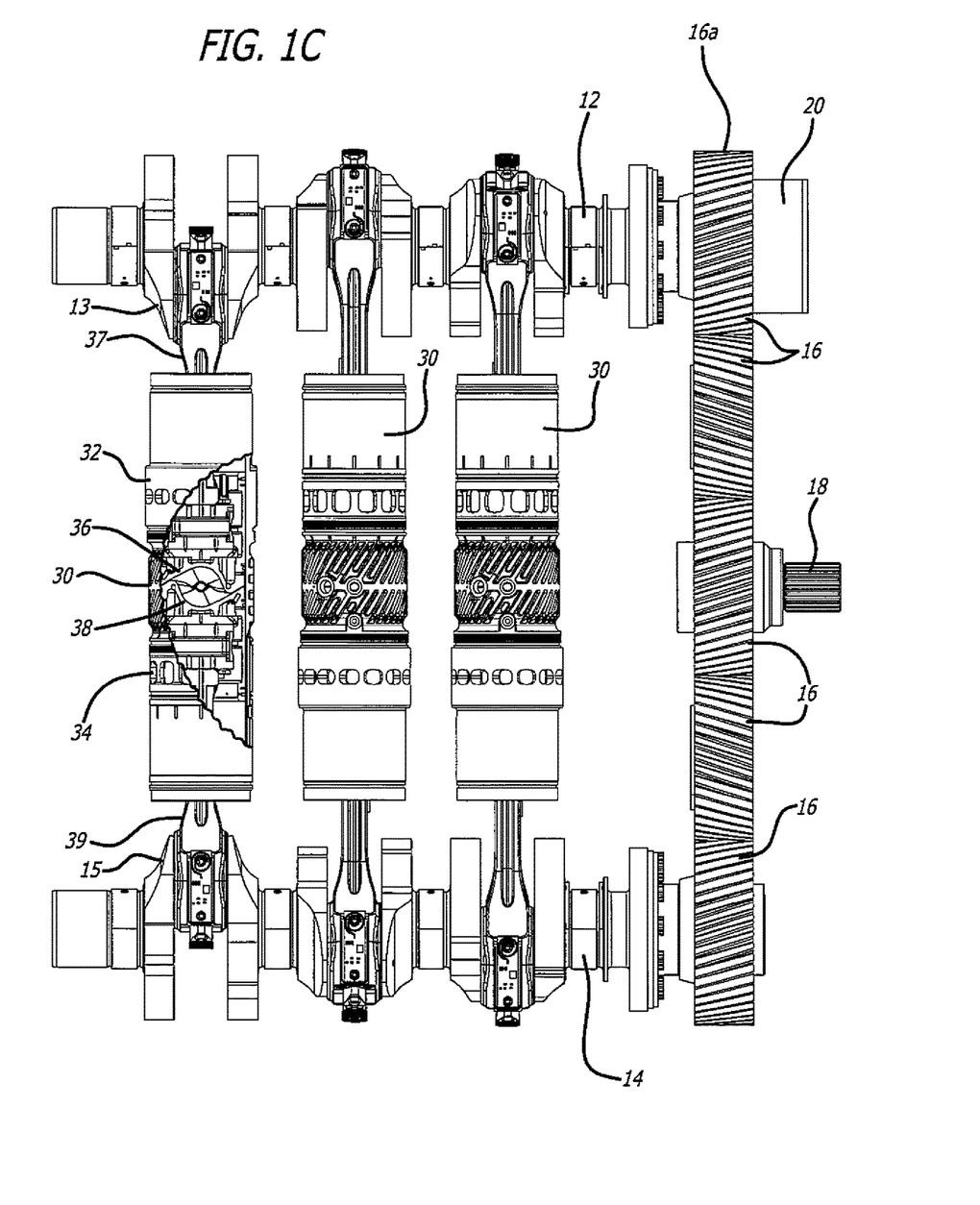
FIG. 1C is a side elevation view of an arrangement of cylinders, pistons, and crankshafts for an opposed-piston engine equipped with an electronically controlled, hydraulically-actuated crank phasing mechanism such as that shown in FIG. 1A.

FIGS. 1A, 1B and 1C show details of an opposed-piston engine 10. Although the figures show the engine 10 in an essentially vertical orientation, this is for the sake of illustration only; in other aspects the engine could be disposed in other orientations than the vertical one shown. The engine 10 includes an interlinked crankshaft system including two rotatably-mounted crankshafts 12 and 14 disposed in a parallel spaced-apart configuration and a gear train assembly 16 linking the crankshafts and coupling them to an output shaft 18. Preferably, the crankshafts are co-rotating, although a counter-rotating arrangement can be provided by deletion of one gear from (or addition of another to) the gear train 16.

As the figures illustrate, the crankshaft system further includes an electronically-controlled, hydraulically-actuated crank phasing mechanism 20 in operable engagement with at least one of the crankshafts 12, 14. In some aspects the crank phasing mechanism 20 is operably coupled between one of the crankshafts and its associated gear in the gear train assembly: preferably, but not necessarily, the crank phasing mechanism is in operable engagement with the exhaust crankshaft 12 and its associated gear 16a.

FIG. 1C is a schematic representation of an arrangement of cylinders, pistons, and crankshafts in an opposed-piston engine equipped with an electronically controlled, hydraulically-actuated crank phasing mechanism such as that shown in FIG. 1A. The figure shows a three-cylinder arrangement, although this is not intended to be limiting; in fact, an electronically controlled, hydraulically-actuated phasing mechanism can be applied to opposed-piston engines with fewer, or more, cylinders. As per the example of FIG. 1C, the opposed-piston engine of FIGS. 1A and 1B includes cylinders 30 (or sleeves or liners), each including exhaust and intake ports 32 and 34. Preferably, the cylinders are fixedly mounted to an engine frame or block (not shown). In this engine construction, a pair of pistons 36, 38 is disposed for opposing reciprocal movement in the bore of each cylinder 30. Each piston 36 is coupled to a respective crank journal 13 of the crankshaft 12 by a connecting rod assembly 37; each piston 38 is coupled to a respective crank journal 15 of the crankshaft 14 by a connecting rod assembly 39. The opening and closing times of the ports 32 and 34 are controlled by opposing movements of the pistons 36 and 37, respectively.

With reference to FIG. 1C, the crank phasing mechanism 20 is operated to adjust the rotational angle of the crankshaft 12 in response to engine operating conditions. Adjustment of the rotational angle of the crankshaft 12 adjusts the phase angle between the crankshafts 12 and 14. In turn, adjusting the phase angle between the crankshafts 12 and 14 adjusts the phase between the pistons 36 and 38, which enables variability of port phasing and port timing in the opposed-piston engine 10. The phasing construction is not necessarily limited to one crankshaft in general or in particular; either or both crankshafts can be equipped with a crank phasing mechanism. Further, those skilled in the art will realize that a phasing mechanism can be provided for one or more of the elements of the interlinked crankshaft system.

Figure 2:
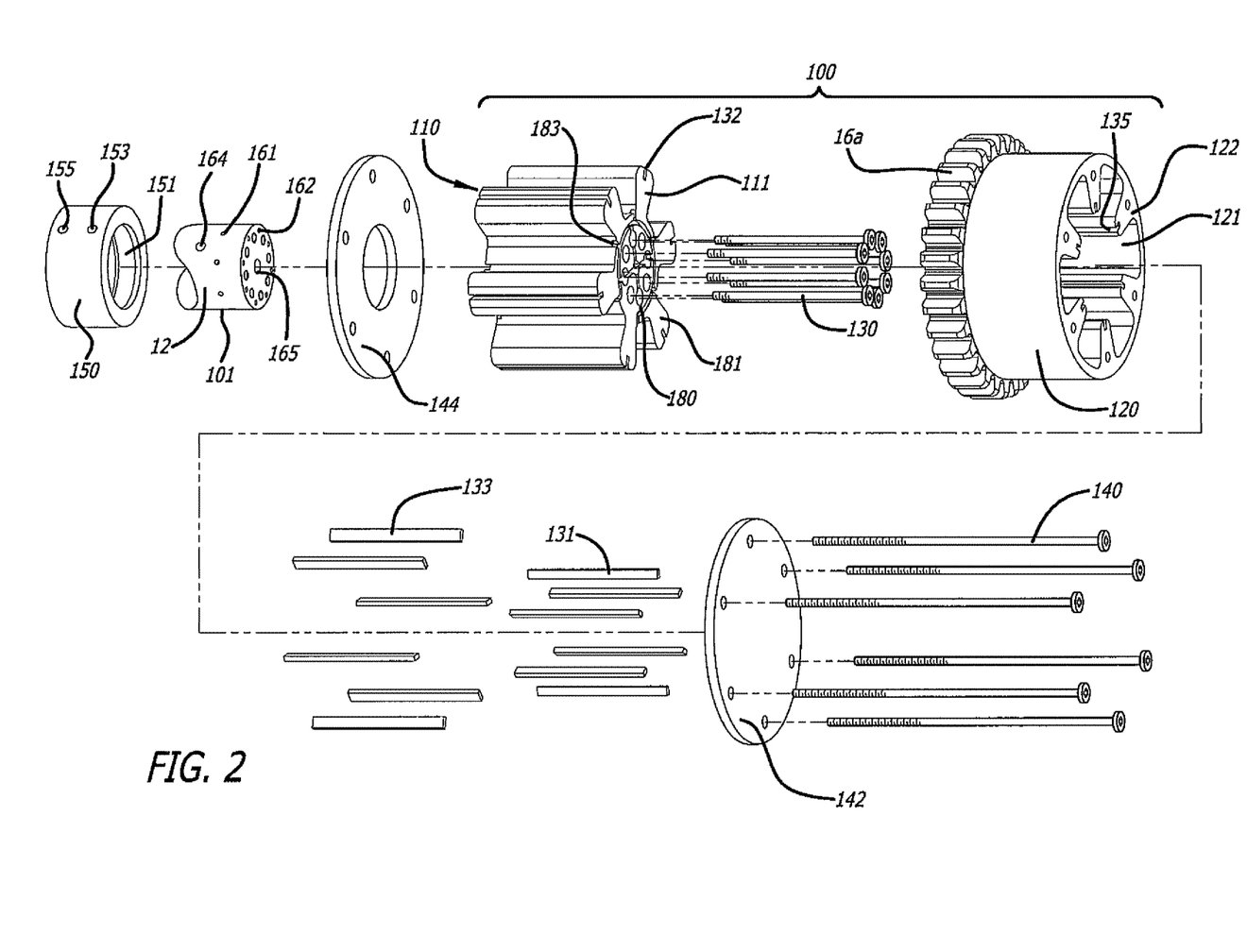
FIG. 2 is an exploded view of a hydraulically-actuated crank phasing mechanism with a coaxial vane assembly.

FIG. 2 is an exploded view of a preferred crank phasing mechanism 20, with which various elements of the mechanism are identified. Generally, the crank phasing mechanism comprises a coaxial vane assembly 100 in which an inner vane element 110 mounted to an end of the crankshaft 12 is positioned within and in coaxial alignment with an annular outer vane element 120 mounted to the gear train element 16a that couples the rotary movement of the crankshaft 12 to the gear train 16. The inner vane element 110 is attached to the end 101 of the crankshaft 12 with threaded bolts 130, with an end closing plate 144 secured therebetween. The annular outer vane element 120, hard mounted to the crankshaft gear 16a, slides over the inner vane element 110 to provide six chambers 121, one for each vane 111, to receive pressurized hydraulic fluid (oil, for example). Torque from the crankshaft 12 is transferred from the vanes 111 to the vanes 122 of the outer vane element 120 by compressing the pressurized hydraulic fluid in the chambers 121, between the two sets of vanes. Polymer apex seals 131 are seated in slots 132 in the outer edges of the inner vanes 111 and polymer apex seals 133 are seated in slots 135 in the edges of the outer vanes 122. These seals prevent seepage of pressurized hydraulic fluid from one side of each of the chambers 121 to the other side, which guarantees integrity of respective pressures acting upon the sides of the vanes. Threaded bolts 140 through front and rear closing plates 142 and 144 keep the pressurized hydraulic fluid captive within the coaxial vane assembly 100, thus maintaining hydraulic pressures within the chambers 121. The plates 142 and 144, which maintain these hydraulic fluid pressures without significant distortion, are sealed on their peripheries to prevent leakage of pressurized hydraulic fluid from the coaxial vane assembly 100.

With further reference to FIG. 2, changing the hydraulic fluid pressures acting against sides of the vanes causes relative movement between the inner vane element 110 and the outer element 120. This is enabled by a fluid transport system that conducts pressurized hydraulic fluid to the chambers 121 and changes fluid pressures as needed to cause relative clockwise (CW) or counterclockwise (CCW) movement between the inner and outer vane elements 110 and 120. Relative movement between the inner and outer vane elements advances or retards the rotational position of the crankshaft 12 with respect to the crankshaft 14.

Figure 3A:
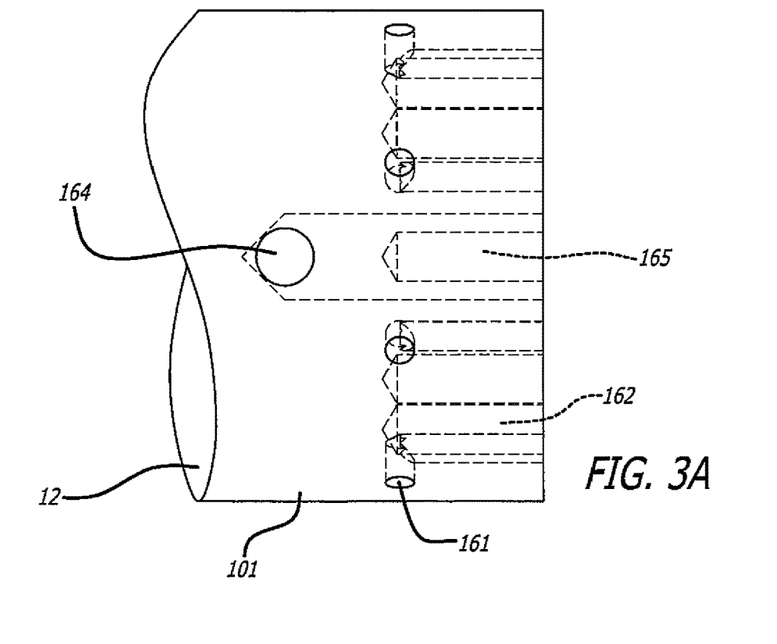
FIG. 3A is an enlarged, partially schematic side view of the end of a crankshaft showing drillings that form part of a fluid transport system.
Figure 3B:
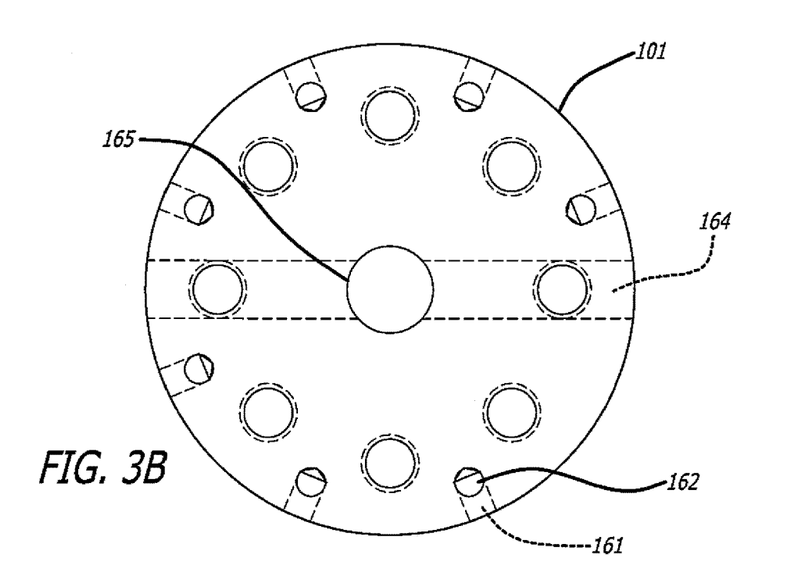
FIG. 3B is an elevation view of the end of the crankshaft.

One example of such a fluid transport system includes a fluid distribution network with a control valve capable of: 1.

enabling pressurized hydraulic fluid to flow in the network, and 2. changing fluid pressures in branches of the network in response to changing engine conditions. With reference again to FIG. 2, the fluid distribution network includes a fluid supply ring 150 cooperating with drilled passages in the end 101 of the crankshaft 12. In this regard, the ring 150 has an inner annular surface in which annular grooves 151 and 152 are formed. Drilled radial passages 153 and 155 extend through the ring 150 to the annular grooves 151 and 152, respectively. With reference to FIGS. 2, 3A, and 3B the end 101 of the crankshaft 12 includes a circumferential array of radial passages 161 and at least one additional radial passage 164 that is axially displaced from the circumferential array. Each of the radial passages 161 intersects a respective axially-aligned passage 162, and the radial passage 164 intersects a central axial passage 165. The ring 150 is fixed to a stationary engine support element such as an engine casing (not shown) at a position where it is maintained in coaxial alignment with the end 101 of the crankshaft 12. At this position, the ring encircles the end 101, with the groove 151 aligned with the radial passages 161 and the groove 152 aligned with the at least one radial passage 162.

Figure 4A:
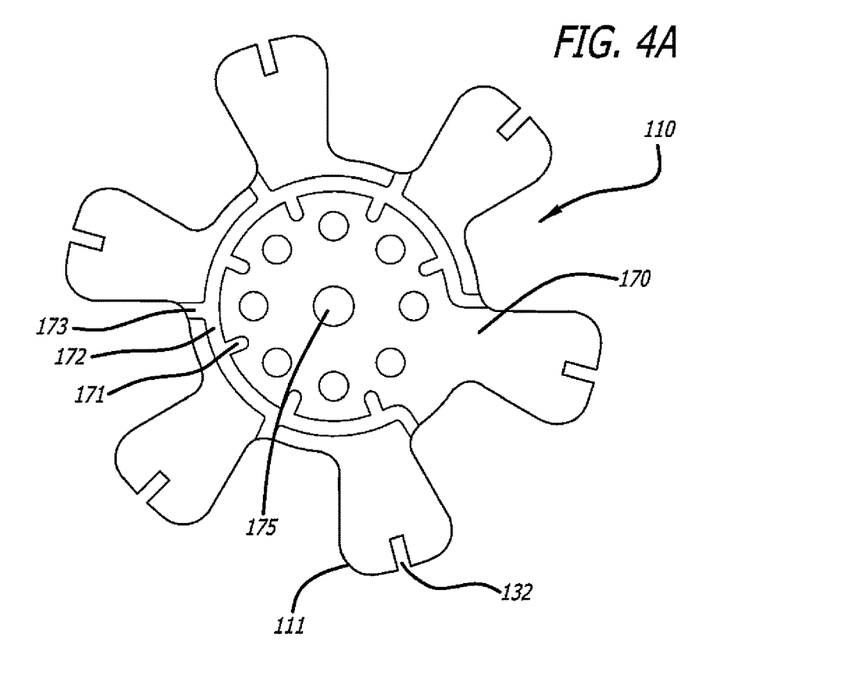
FIG. 4A is a front end view of an inner member of the coaxial vane assembly of FIG. 2 showing fluid flow paths.
Figure 4B:
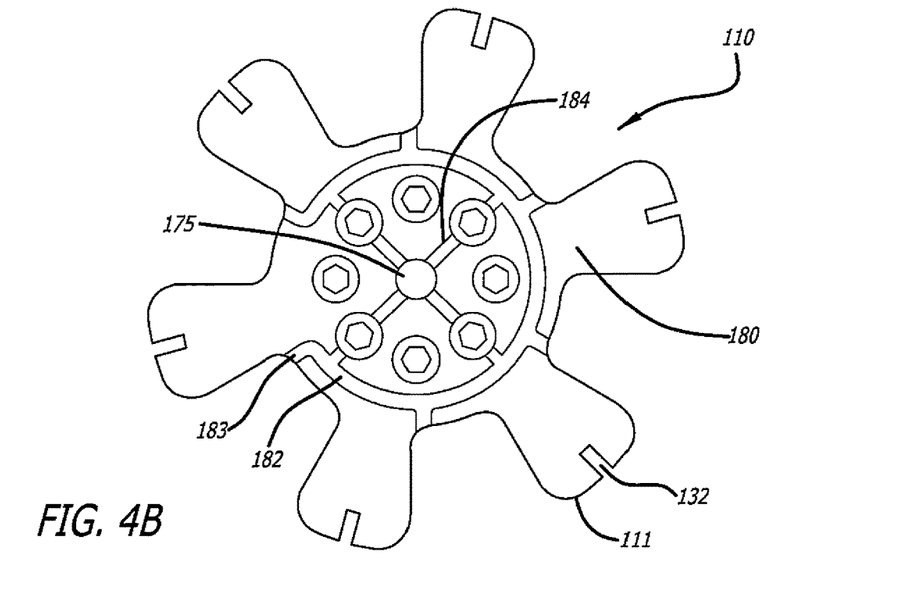
FIG. 4B is a rear end view of the inner member depicting associated fluid flow paths.

Referring now to FIGS. 2, 4A, and 4B the inner vane element 110 has a first end surface 170, which is not visible in FIG. 2, and an opposing second end surface 180 which is visible in FIG. 2. As best seen in FIG. 4A, the first end surface 170 has a circular groove 172 with inner radial grooves 171 and outwardly-projecting grooves 173. A central axial passage 175 through the inner vane element 110 extends from the first end surface 170 to the second end surface 180. As best seen in FIG. 4B, the second end surface 180 has a circular groove 182 with outwardly-projecting grooves 183. One or more diametric grooves run from the central axial drilling 175 to the circular groove 182. When the coaxial vane assembly 100 is assembled, the first end surface 170 is positioned against and flush with the end face of the crankshaft 12, the inner radial grooves are aligned with the passages 162 of the crankshaft 12, and the central axial drilling 175 is aligned with the central axial passage 165 in the crankshaft 12. Therefore, while the crankshaft 12 rotates, the pressurized hydraulic fluid can be transported into the coaxial vane assembly 100 via a first fluid network branch 153/151/161/162/171/172/173 and via a second fluid network branch 155/152/164/165/175/184/182/183. Note that when the coaxial vane assembly is assembled, and the inner vane member 110 is positioned within the outer vane member 120, the seals 131 and 133 mutually isolate the chambers 121 and further subdivide each chamber 121 into two mutually isolated, parallel, elongate subchambers. One subchamber is fed through one fluid network branch from the first end surface 170 by a respective one of the outwardly projecting grooves 173; the other subchamber is fed through the other fluid network branch from the second end surface 180 by a respective one of the outwardly projecting grooves 183.

The direction of relative movement between the inner and outer vane members 110, 120 is determined by a hydraulic fluid pressure differential between the annular grooves 151, 152 in the fluid supply ring 150. When the fluid pressure on one side of the vanes is greater than the fluid pressure on the opposite side, the lower pressure hydraulic fluid will tend to move out of its subchamber space and relative movement will be in the direction of the lower pressure. Control of the hydraulic pressure in this regard is provided by a multistate valve under control of an engine control unit (ECU).

Figure 5A:
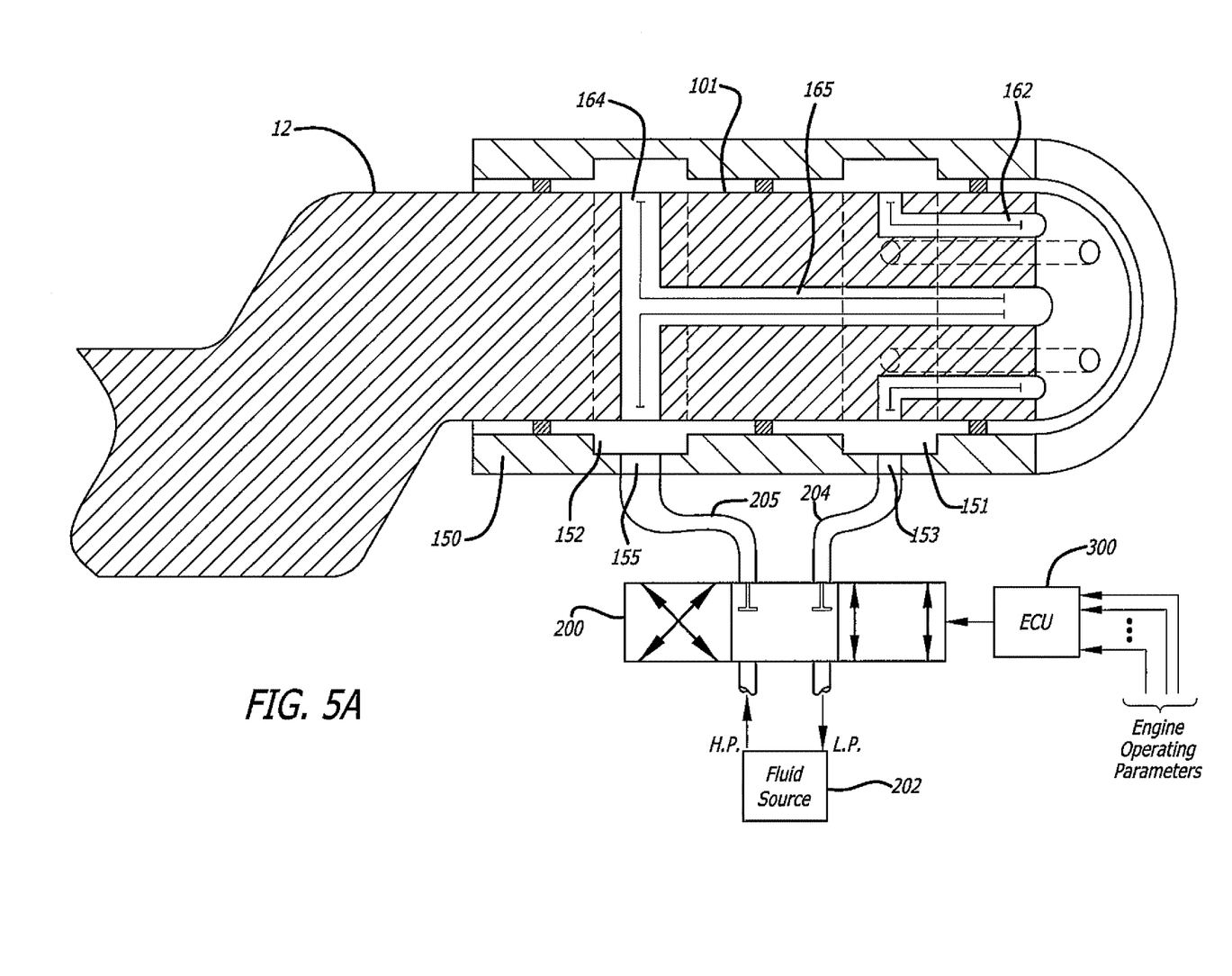
FIGS. 5A, 5B, 5C are perspective section views of a portion of the end of the crankshaft of FIG. 4A showing an electronically-controlled valve for supplying hydraulic fluid to actuate the crank phasing mechanism of FIG. 2.
Figure 5B:
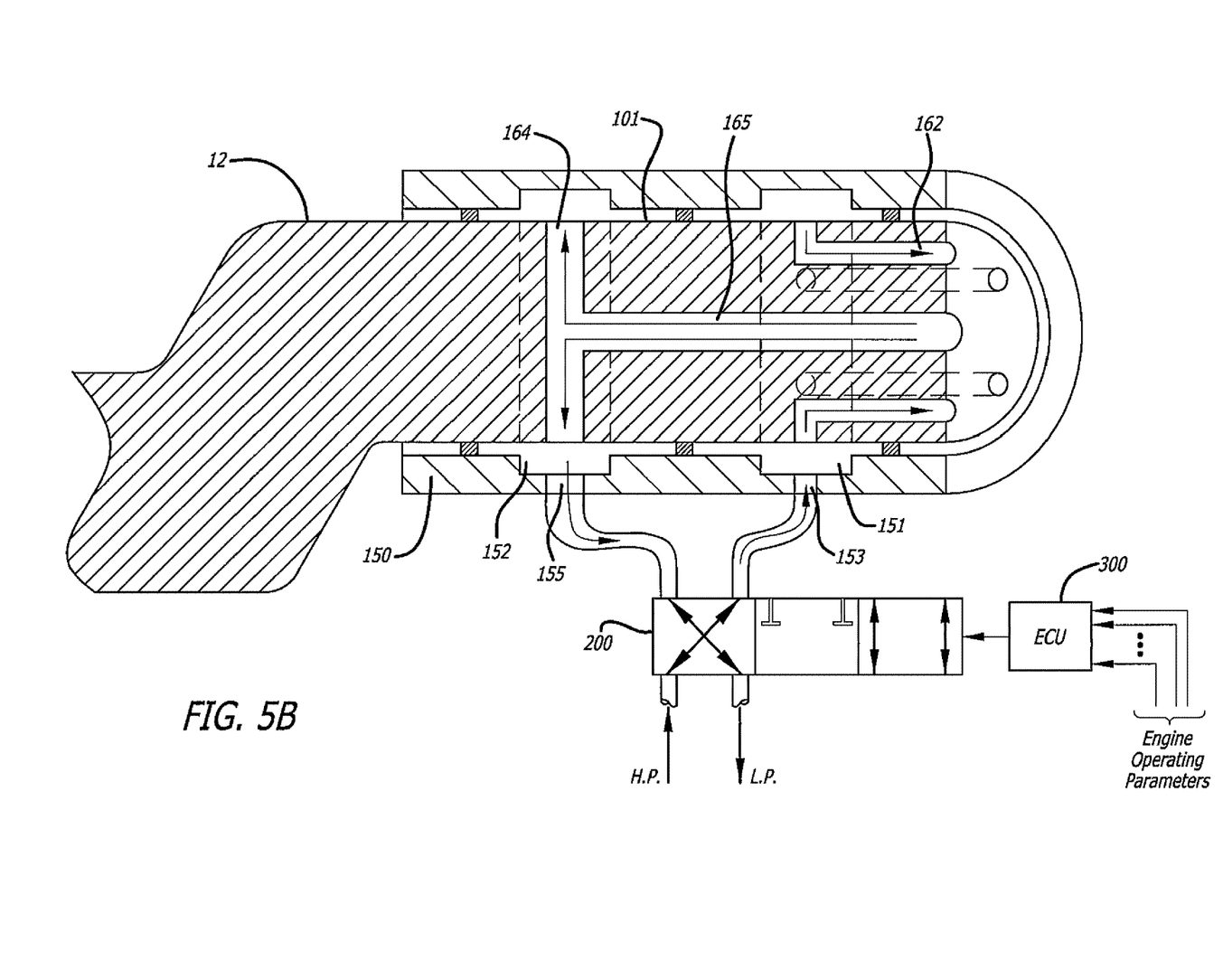
Figure 5C:
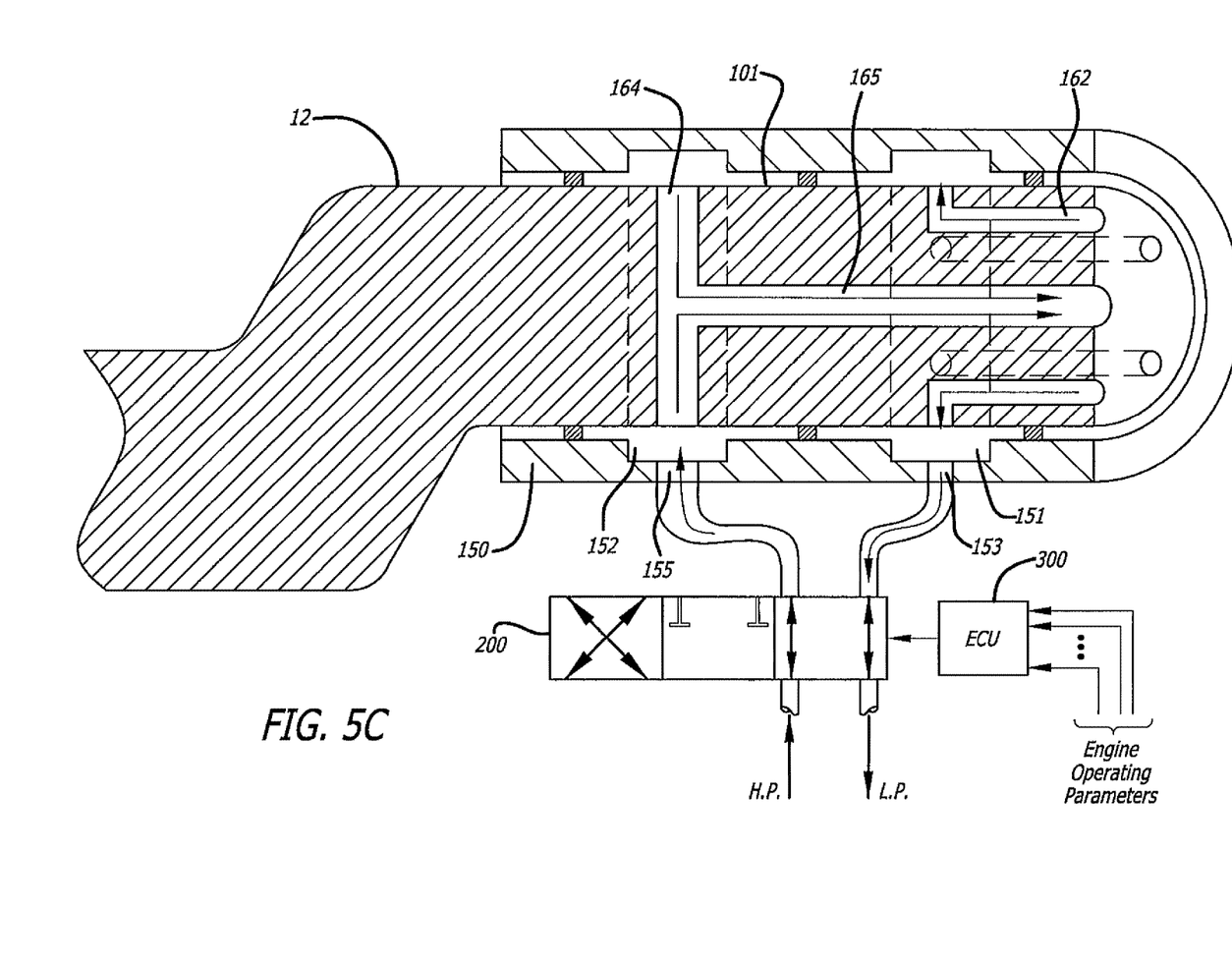

With reference to FIGS. 5A-5C, an electrically controlled and actuated multi-state valve 200 is provided to control the flow of pressurized hydraulic fluid in the coaxial vane assembly 100 via the fluid control ring 150. In some aspects, the valve 200 operates in response to signals generated by an ECU 300; that is to say, the ECU 300 sets the valve 200 to a state determined by the ECU in response to engine operating parameters. A representative valve for this purpose is a standard 4/3 directional control valve, (4 line, 3 direction valve). Hydraulic fluid is provided to the valve 200 from a fluid source 202 via input (H.P.) and return (L.P.) lines. The valve has two output connections 204 and 205 connected to the passages 153 and 155, respectively, of the fluid supply ring 150.

FIGS. 5A, 5B and 5C show such the valve 200 in respective ones of three possible states. FIG. 5A shows the valve 200 in a center position where both of the annular grooves 151, 152 in the fluid supply ring 150 are disconnected by the valve 200 from the fluid source 202 so that the vanes are retained in a stationary position last selected by the ECU 300. FIG. 5B shows the valve 200 set to a state in which it connects the return (L.P.) line to the annular ring 152 and the input (H.P.) line to the annular ring 151. This state increases the fluid pressure on the sides of the vanes in fluid communication with first fluid network branch while decreasing the fluid pressure on the sides of the vanes in fluid communication with the second fluid network branch so that the vanes move (CW, for example) towards the low pressure sides of the chambers. FIG. 5C shows the valve 200 set to a state in which it connects the return (L.P.) line to the annular ring 151 and the input (H.P.) line to the annular ring 152. This state decreases the fluid pressure on the sides of the vanes in fluid communication with first fluid network branch while increasing the fluid pressure on the sides of the vanes in fluid communication with the second fluid network branch so that the vanes move (CCW, for example) towards the low pressure sides of the chambers.

The ECU 300 (or another controller) regulates port timing and/or port phasing of the opposed-piston engine by controlling the operation of the crank phasing mechanism. Regulation, or control, of port phasing is enabled by the ECU's control of the operation of the valve 200. The ECU 300 receives signals that represent values of engine operating parameters. For example the ECU 300 may receive signals representing engine speed, engine load, current crank angle of one or each of the crankshafts, charge air flow and composition, and, possibly, additional data. The ECU processes the signals and subjects the values to an algorithm or procedure for determining a port operating point, and then sets the valve 200 to the second or the third state (FIG. 5B or FIG. 5C) to change the crankshaft phasing to a set point value that achieves the port operating point. Once the crank phasing set point is achieved, the ECU 300 resets the valve 200 to the first state, which maintains the port operating point until a new one is determined.

An additional benefit of the crank phasing mechanism is found in the fact that since the total pressures exerted upon the vanes are constant, an automatic damping effect is present at all times. This means that any forces acting upon the vanes due to torsional vibration and/or gear backlash will automatically be mitigated by this damping effect.

Although principles of crankshaft phasing to control port timing have been described with reference to presently preferred embodiments, it should be understood that various modifications can be made without departing from the spirit of the described principles. Accordingly, any patent protection accorded to the principles is limited only by the following claims.

We Claim:

1. An opposed-piston, internal combustion engine comprising:
   one or more cylinders, each cylinder including exhaust and intake ports near respective outer ends of the cylinder, wherein the cylinders are juxtaposed and oriented with exhaust and intake ports mutually aligned;
   a pair of crankshafts rotatably mounted near respective exhaust and intake ends of the cylinders;
   a pair of pistons disposed in each cylinder for opening and closing the ports of the cylinder by opposed sliding movement in the bore of the cylinder;
   all of the pistons opening and closing the exhaust ports being coupled by connecting rods to the crankshaft mounted near the exhaust ends of the cylinders, and all of the pistons opening and closing the intake ports being coupled by connecting rods to the crankshaft mounted near the intake ends of the cylinders;
   a gear train coupling the crankshafts to an output drive; and,
   a crank phasing mechanism operatively coupled to a crankshaft and to the gear train for changing a crank angle of the crankshaft.

2. The opposed-piston, internal combustion engine of claim 1, in which the crank phasing mechanism includes a hydraulically-actuated coaxial vane assembly operatively coupled to an end of the crankshaft and to a gear of the gear train that is associated with the crankshaft.

3. The opposed-piston, internal combustion engine of claim 2, in which the coaxial vane assembly includes an inner vane element mounted to an end of the crankshaft and an annular outer vane element mounted to the gear, wherein the inner vane element is positioned within and in coaxial alignment with the annular outer vane element.

4. The opposed-piston, internal combustion engine of claim 3, further comprising:
   a hydraulic fluid network operable to conduct pressurized hydraulic fluid to actuate the coaxial vane assembly;
   a multistate valve coupled to transport hydraulic fluid into the hydraulic fluid network; and,
   a controller in operable connection with the valve for setting the valve to a first state causing the coaxial vane assembly to maintain a crank angle of the crankshaft, or to a second state to change the crank angle of the crankshaft.

5. The opposed-piston, internal combustion engine of claim 3, further comprising:
   a hydraulic fluid network operable to conduct pressurized hydraulic fluid to actuate the coaxial vane assembly;
   a controller in operable connection with the hydraulic fluid network for causing the coaxial vane assembly to change the crank angle of the crankshaft in response to one or more of engine speed, engine load, a current crank angle, charge air flow, and charge air composition.

6. An interlinked crankshaft system for controlling port phasing in ported cylinders of an opposed-piston engine comprising:
   a pair of parallel, spaced-apart, rotatably mounted crankshafts;
   a pair of pistons disposed in each cylinder for opening and closing exhaust and intake ports of the cylinder by opposed sliding movement in the bore of the cylinder;
   a first crankshaft of the pair of crankshafts including at least one crank journal for being operably coupled to a first piston of a pair of opposed-pistons and a second crankshaft of the pair of crankshafts including at least one crank journal for being operably coupled to a second piston of the pair of opposed-pistons;
   a gear train coupling the crankshafts to an output drive; and,
   a crank phasing mechanism operatively coupled to a crankshaft and to the gear train for changing a crank angle of the crankshaft.

7. The interlinked crankshaft system of claim 6, in which the crank phasing mechanism includes a hydraulically-actuated coaxial vane assembly operatively coupled to an end of the crankshaft and to a gear of the gear train that is associated with the crankshaft.

8. The interlinked crankshaft system of claim 7, in which the coaxial vane assembly includes an inner vane element mounted to an end of the crankshaft and an annular outer vane element mounted to the gear, wherein the inner vane element is positioned within and in coaxial alignment with the annular outer vane element.

9. The interlinked crankshaft system of claim 8, further comprising:
   a hydraulic fluid network operable to conduct pressurized hydraulic fluid to actuate the coaxial vane assembly;
   a multistate valve coupled to transport hydraulic fluid into the hydraulic fluid network; and,
   a controller in operable connection with the valve for setting the valve to a first state causing the coaxial vane assembly to maintain a crank angle of the crankshaft, or to a second state to change the crank angle of the crankshaft.

10. The interlinked crankshaft system of claim 8, further comprising:
    a hydraulic fluid network operable to conduct pressurized hydraulic fluid to actuate the coaxial vane assembly;
    a controller in operable connection with the hydraulic fluid network for causing the coaxial vane assembly to change the crank angle of the crankshaft in response to one or more of engine speed, engine load, a current crank angle, charge air flow, and charge air composition.

11. A method of adjusting port timing in an opposed-piston, internal combustion engine including one or more ported cylinders that are juxtaposed and oriented with exhaust and intake ports mutually aligned, a pair of crankshafts, each crankshaft rotatably mounted near a respective one of exhaust and intake ends of the cylinders, a pair of pistons disposed for opposed sliding movement in the bore of each cylinder, all of the pistons controlling the exhaust ports being coupled by connecting rods to the crankshaft mounted near the exhaust ends of the cylinders, and all of the pistons controlling the intake ports being coupled by connecting rods to the crankshaft mounted near the intake ends of the cylinders, the method comprising:
    linking the crankshafts with a gear train,
    opening and closing the exhaust port and the intake port of each cylinder by opposed sliding movement of pistons in the bore of the cylinder during operation of the engine,
    operating a crank phasing mechanism in operable engagement with at least one of the crankshafts to adjust a crank angle of at least one of the crankshafts during engine operation,
    changing piston phasing to in response to adjustment of the crank angle, and
    changing port opening and closing times in response to changing piston phasing.

12. A method according to claim 11, in which the crank angle is changed in response to one or more of engine speed, engine load, a crank angle, charge air flow, and charge air composition.

* * * * *